US010925089B2

(12) United States Patent
Harada et al.

(10) Patent No.: US 10,925,089 B2
(45) Date of Patent: Feb. 16, 2021

(54) USER TERMINAL, RADIO BASE STATION, AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/070,741

(22) PCT Filed: Jan. 20, 2017

(86) PCT No.: PCT/JP2017/001936
§ 371 (c)(1),
(2) Date: Jul. 17, 2018

(87) PCT Pub. No.: WO2017/126658
PCT Pub. Date: Jul. 27, 2017

(65) Prior Publication Data

US 2019/0021112 A1 Jan. 17, 2019

(30) Foreign Application Priority Data

Jan. 20, 2016 (JP) ................................ 2016-009116

(51) Int. Cl.
*H04W 74/08* (2009.01)
*H04W 16/14* (2009.01)
(Continued)

(52) U.S. Cl.
CPC .......... *H04W 74/0808* (2013.01); *H04J 1/00* (2013.01); *H04L 1/1812* (2013.01);
(Continued)

(58) Field of Classification Search
CPC ................................................ H04W 74/0808
See application file for complete search history.

(56) References Cited

U.S. PATENT DOCUMENTS

2017/0078995 A1* 3/2017 Dinan .................. H04W 16/14
2017/0135090 A1* 5/2017 Yin ...................... H04L 1/1671
(Continued)

OTHER PUBLICATIONS

Alcatel-Lucent, et al.; "Control Signaling for LAA"; 3GPP TSG RAN WG1 Meeting #80bis, R1-151484; Belgrade, Serbia; Apr. 20-24, 2016 (4 pages).
(Continued)

*Primary Examiner* — Edan Orgad
*Assistant Examiner* — Abdeltif Ajid
(74) *Attorney, Agent, or Firm* — Osha Bergman Watanabe & Burton LLP

(57) ABSTRACT

This invention aims to achieve appropriate communication in a communication system which uses a cell defined to apply listening. This invention provides a user terminal which performs communication using cells including an LAA cell which applies listening before UL transmission, the terminal including a transmission unit which transmits uplink control information and uplink data, and a control unit which controls transmission of the uplink control information and the uplink data, wherein the control unit performs control to transmit the uplink control information using an uplink channel other than an uplink shared channel of the LAA cell.

11 Claims, 13 Drawing Sheets

(51) Int. Cl.
*H04J 1/00* (2006.01)
*H04L 1/18* (2006.01)
*H04W 74/00* (2009.01)

(52) U.S. Cl.
CPC .......... *H04L 1/1854* (2013.01); *H04W 16/14* (2013.01); *H04W 74/004* (2013.01)

(56) References Cited

U.S. PATENT DOCUMENTS

2018/0007643 A1* 1/2018 Tiirola ................ H04W 52/146
2018/0359072 A1* 12/2018 Tiirola .................. H04L 1/1812

OTHER PUBLICATIONS

Ericsson; "On UCI Design for LAA"; 3GPP TSG RAN WG1 Ad-hoc Meeting, R1-151134; Paris, France; Mar. 24-26, 2015 (7 pages).
ITL; "On the CSI measurement and reports for LAA"; 3GPP TSG RAN WG1 Meeting #80bis, R1-153272; Fukuoka, Japan; May 25-29, 2015 (4 pages).
Samsung; "Discussion on UL transmission for LAA"; 3GPP TSG RAN WG1 Meeting #81, R1-152872; Fukuoka, Japan; May 25-29, 2015 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
AT&T; "Drivers, Benefits and Challenges for LTE in Unlicensed Spectrum"; 3GPP TSG-RAN Meeting #62, RP-131701; Susan, Korea; Dec. 3-6, 2013 (3 pages).
International Search Report issued in PCT/JP2017/001936 dated Mar. 14, 2017 (2 pages).
Written Opinion issued in PCT/JP2017/001936 dated Mar. 14, 2017 (4 pages).
3GPP TSG-RAN WG2 Meeting #92; R2-156918 "Introduction of Licensed-Assisted Access using LTE" Huawei, HiSilicon; Anaheim, USA; Nov. 16-20, 2015 (2 pages).
3GPP TSG-RAN WG2 Meeting #72; R2-106892 "UE capability signalling for CA and MIMO in REL10" Nokia Siemens Networks, Nokia Corporation; Jacksonville, U.S.A.; Nov. 15-19, 2010 (12 pages).
3GPP TSG-RAN2#73bis; R2-112355 "Rel-10 LTE UE capability signaling" NTT DOCOMO, Inc.; Shanghai, China; Apr. 11-15, 2011 (16 pages).
3GPP TSG RAN WG1 Meeting #81; R1-153139 "On UCI Design for LAA with DL and UL Transmissions" Ericsson; Fukuoka, Japan; May 25-29, 2015 (3 pages).
Office Action issued in Japanese Application No. 2016-009116; dated Mar. 1, 2017 (6 pages).
Office Action issued in Japanese Application No. 2016-009116; dated Aug. 29, 2017 (8 pages).
Extended European Search Report issued in European Application No. 17741535.3, dated Nov. 6, 2018 (6 pages).

* cited by examiner

LICENSED BANDS
UNLICENSED BANDS
CC#1
PCell
CC#2
SCell
CC#3
SCell
CC#4
LAA SCell
CC#5
LAA SCell
PUSCH
PUCCH
Freq.

LICENSED BANDS
UNLICENSED BANDS
CC#1
PCell
CC#2
SCell
CC#3
SCell
CC#4
LAA SCell
CC#5
LAA SCell
PUSCH
UCI
Freq.

USER TERMINAL, RADIO BASE STATION, AND RADIO COMMUNICATION METHOD

TECHNICAL FIELD

The present invention relates to a user terminal, a radio base station, and a wireless communication method for next-generation mobile communication systems.

BACKGROUND ART

In UMTS (Universal Mobile Telecommunications System) networks, LTE (Long Term Evolution) has been specified to achieve, e.g., higher data rates and lower delays (non-patent literature 1). To achieve broader bands and higher speeds than LTE, LTE-Advanced (Rel. 10-12) has been specified, and a successor to LTE called, e.g., 5G (5th generation mobile communication systems) is under study.

In LTE Rel. 8-12, specifications have been established assuming exclusive operation in frequency bands (also called licensed bands) licensed to network operators (operators). As such licensed bands, 800 MHz, 1.7 GHz, and 2 GHz, for example, are used.

The recent prevalence of advanced UE (User Equipment) such as smartphones or tablets rapidly increases user traffic. To absorb the increasing user traffic, a demand has arisen to add another frequency band, but the spectrum of licensed bands (licensed spectrum) is limited.

Under the circumstances, in LTE Rel. 13, enhancement of the frequencies of LTE systems using bands (also called unlicensed bands) having an unlicensed spectrum available in addition to licensed bands has been examined (non-patent literature 2). As such unlicensed bands, 2.4- and 5-GHz bands available for Wi-Fi® and Bluetooth®, for example, have been considered to be utilized.

More specifically, in LTE Rel. 13, CA (Carrier Aggregation) between licensed bands and unlicensed bands has been examined. Communication performed using not only licensed bands but also unlicensed bands in this manner is called LAA (License-Assisted Access). In the future, DC (Dual Connectivity) of licensed bands and unlicensed bands, and SA (Stand-Alone) of unlicensed bands will be considered in LAA.

CITATIONS LIST

Non-Patent Literature

Non-patent literature 1: 3GPP TS 36.300 "Evolved Universal Terrestrial Radio Access (E-UTRA) and Evolved Universal Terrestrial Radio Access Network (E-UTRAN); Overall description; Stage 2"

Non-patent literature 2: AT&T, Drivers, Benefits and Challenges for LTE in Unlicensed Spectrum, 3GPP TSG-RAN Meeting #62 RP-131701

SUMMARY OF INVENTION

Technical Problem

In unlicensed bands, deployment of an interference control function has been examined for coexistence with LTE, Wi-Fi, or other systems on other network operators. In Wi-Fi, LBT (Listen Before Talk) based on CCA (Clear Channel Assessment) is utilized as an interference control function in the same frequency ranges.

When unlicensed bands are set in LTE systems, listening (e.g., LBT) is also expected to be applied as an interference control function to control UL transmission and/or DL transmission.

On the other hand, when listening is applied to control transmission, whether and when to transmit are changed on the basis of the result of listening executed before transmission. For example, when a UL signal with respect to a DL signal received in an unlicensed band by a user terminal (user equipment) is transmitted at a predetermined timing, feedback may not be done at the predetermined timing, depending on the listening result. Therefore, directly applying a wireless (radio) communication scheme (e.g., a UL transmission method) used in an existing radio communication system (e.g., LTE Rel. 8-12) to a cell defined to apply listening may result in inappropriate communication.

The present invention has been made in consideration of the above-described issue, and has as one object to provide a user terminal, a radio base station, and a radio communication method which can achieve appropriate communication in a communication system which uses a cell defined to apply listening.

Solution to Problem

In an aspect, a user terminal according to the present invention performs communication using cells including an LAA cell which applies listening before UL transmission, the terminal including a transmission unit which transmits uplink control information and uplink data, and a control unit which controls transmission of the uplink control information and the uplink data, wherein the control unit performs control to transmit the uplink control information using an uplink channel other than an uplink shared channel of the LAA cell.

Advantageous Effects of Invention

According to the present invention, appropriate communication can be achieved in a communication system which uses a cell defined to apply listening.

DESCRIPTION OF EMBODIMENTS

Figure 1A:
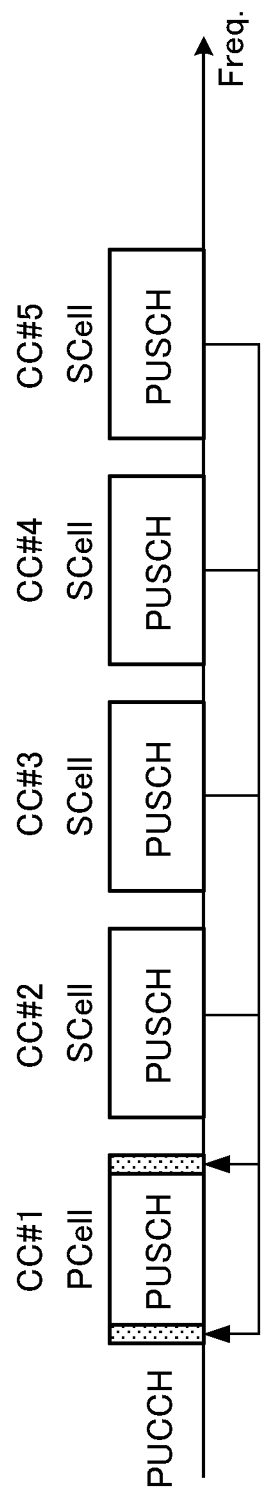
FIGS. 1A and 1B are diagrams illustrating exemplary methods for assigning uplink control information in existing systems.

In a system (e.g., an LAA system) which operates LTE/LTE-A in unlicensed bands, an interference control function may be preferably deployed for coexistence with LTE, Wi-Fi, or other systems on other network operators. A system which operates LTE/LTE-A in unlicensed bands may be collectively referred to as, e.g., LAA, LAA-LTE, LTE-U, or U-LTE, regardless of whether the operation form is CA, DC, or SA.

In general, a transmission point (e.g., a radio base station (eNB) or a user terminal (UE)) which performs communication using carriers (which may also be referred to as carrier frequencies or simply as frequencies) in an unlicensed band is prohibited from performing transmission with the carriers of the unlicensed band when a different entity (e.g., a different user terminal) which performs communication with these carriers is detected.

The transmission point, therefore, executes listening (LBT: Listen Before Talk) a certain period before the timing of transmission. More specifically, the transmission point that executes LBT searches the entire target carrier band (e.g., one CC (Component Carrier)) a certain period before the timing of transmission to confirm whether any different device (e.g., a radio base station, a user terminal, or a Wi-Fi device) is in communication with the carrier band.

In this specification, listening means an operation for, before one transmission point (e.g., a radio base station or a user terminal) transmits a signal, detecting/measuring whether a signal which exceeds a certain level (e.g., a certain power) is transmitted from, e.g., another transmission point. Listening executed by a radio base station and/or a user terminal may also be referred to as, e.g., LBT, CCA (Clear Channel Assessment), or carrier sensing.

The transmission point performs transmission using the carriers when it can confirm that no different device is in communication. For example, the transmission point performs transmission by determining that the channel is in an idle state ($LBT_{idle}$) when the received power (the received signal power during the LBT period) measured by LBT is equal to or lower than a certain threshold. The expression "the channel is in an idle state" means that the channel is not occupied by a particular system, and it can be reworded as, for example, "the channel is idle," "the channel is clear," "the channel is free," or the like.

The transmission point stops its transmission processing when any different device is detected to be in use even in a part of the target carrier band. For example, when the received power of a signal from any different device related to the band is detected to exceed a certain threshold, the transmission point does not perform transmission by determining that the channel is in a busy state ($LBT_{busy}$). In $LBT_{busy}$, the channel becomes available only after LBT is executed again so that it can be confirmed that the channel is in an idle state. The method for determining an idle state/busy state of the channel by LBT is not limited to this.

As a mechanism (scheme) for LBT, FBE (Frame Based Equipment) and LBE (Load Based Equipment) are under study. Examples of the differences between these two schemes may include the frame configuration used in transmission and reception and the channel occupation time. In the FBE, the configuration for transmission and reception related to LBT has a fixed timing. In the LBE, the configuration for transmission and reception related to LBT is not constant in the time-axis direction and LBT is executed in response to demands.

More specifically, the FBE is a mechanism which has a fixed frame period and in which transmission is performed when the channel is determined to be available as a result of carrier sensing for a certain period of time (which may also be referred to as, e.g., an LBT duration) in a certain frame, but the process waits without transmission until the carrier sense timing in the next frame when the channel is determined to be unavailable.

The LBE mechanism executes the ECCA (Extended CCA) procedure in which the carrier sense time is extended when the channel is determined to be unavailable as a result of carrier sensing (initial CCA), and carrier sensing is continuously performed until the channel becomes available. The LBE may preferably involve random back-off for appropriate contention avoidance.

The carrier sense time (that may also be referred to as a carrier sense period) is the time (e.g., the length of one symbol) to determine whether the channel is available by executing processing such as listening so as to obtain one LBT result.

The transmission point can transmit a predetermined signal (e.g., a channel reservation signal) in accordance with an LBT result. The LBT result means information (e.g., $LBT_{idle}$ or $LBT_{busy}$) concerning the availability of a channel obtained by LBT in carriers for which LBT is set.

Upon starting transmission when the LBT result is an idle state ($LBT_{idle}$), the transmission point can perform transmission by omitting LBT for a certain period (e.g., 10 to 13 ms). Such transmission may also be referred to as, e.g., burst transmission, bursting, or transmission bursting.

As described above, interference between LAA and Wi-Fi, interference between LAA systems, and the like can be avoided by introducing interference control in the same frequency range based on the LBT mechanism to transmission points in the LAA systems. Even when transmission points are independently controlled for each operator that operates an LAA system, interference can be reduced without determining by LBT the details of each control process.

In CA of existing LTE systems (Rel. 10-12), UCI (Uplink Control Information) to be transmitted from the user terminal is transmitted by a PUCCH (Physical Uplink Control Channel). When a PUCCH and a PUSCH (Physical Uplink Shared Channel) are transmitted without setting simultaneous transmission of a PUCCH and a PUSCH, the user terminal multiplexes (piggybacks) all pieces of uplink control information on the PUSCH and transmits them.

Figure 1B:
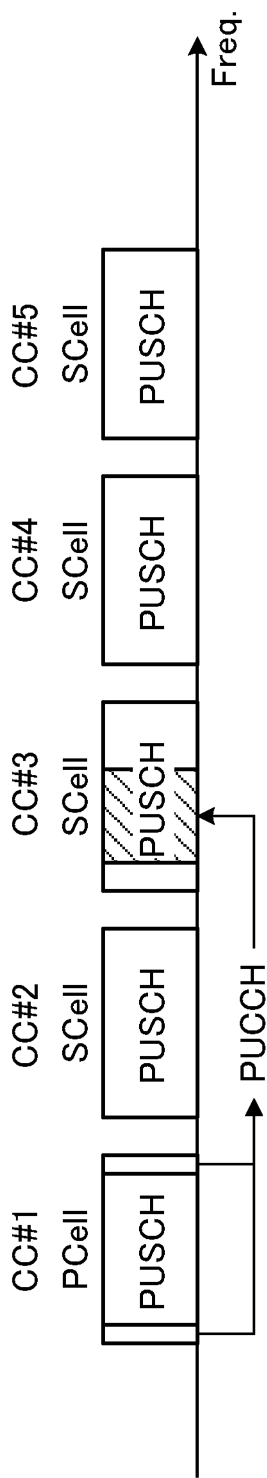

FIG. 1 illustrates diagrams of exemplary methods for transmitting UCI (Uplink Control Information) in Rel. 10-12. FIG. 1A illustrates a UCI multiplexing method when no uplink data transmission instruction (PUSCH transmission) is issued, and FIG. 1B illustrates a UCI multiplexing method when an uplink data transmission instruction is issued. FIG. 1 illustrates exemplary cases where five CCs (one PCell and four SCells) are set.

More specifically, FIG. 1A illustrates that PUSCH transmission is not performed in CC#1 to CC#5 in a certain subframe. In this case, the user terminal multiplexes uplink control information in each CC on a PUCCH in a predetermined CC (CC#1 in this case) and transmits it. The predetermined CC will also be referred to as, e.g., a primary cell, a PSCell, or a PUCCH cell hereinafter.

FIG. 1B illustrates that uplink data (PUSCH transmission) to be transmitted to the radio base station in CC#3 (SCell) is available in a certain subframe. In this case, the user terminal multiplexes (piggybacks) uplink control information (uplink control information to be transmitted by a PUCCH in CC#1) on a PUSCH in CC#3, and transmits it.

Figure 2:
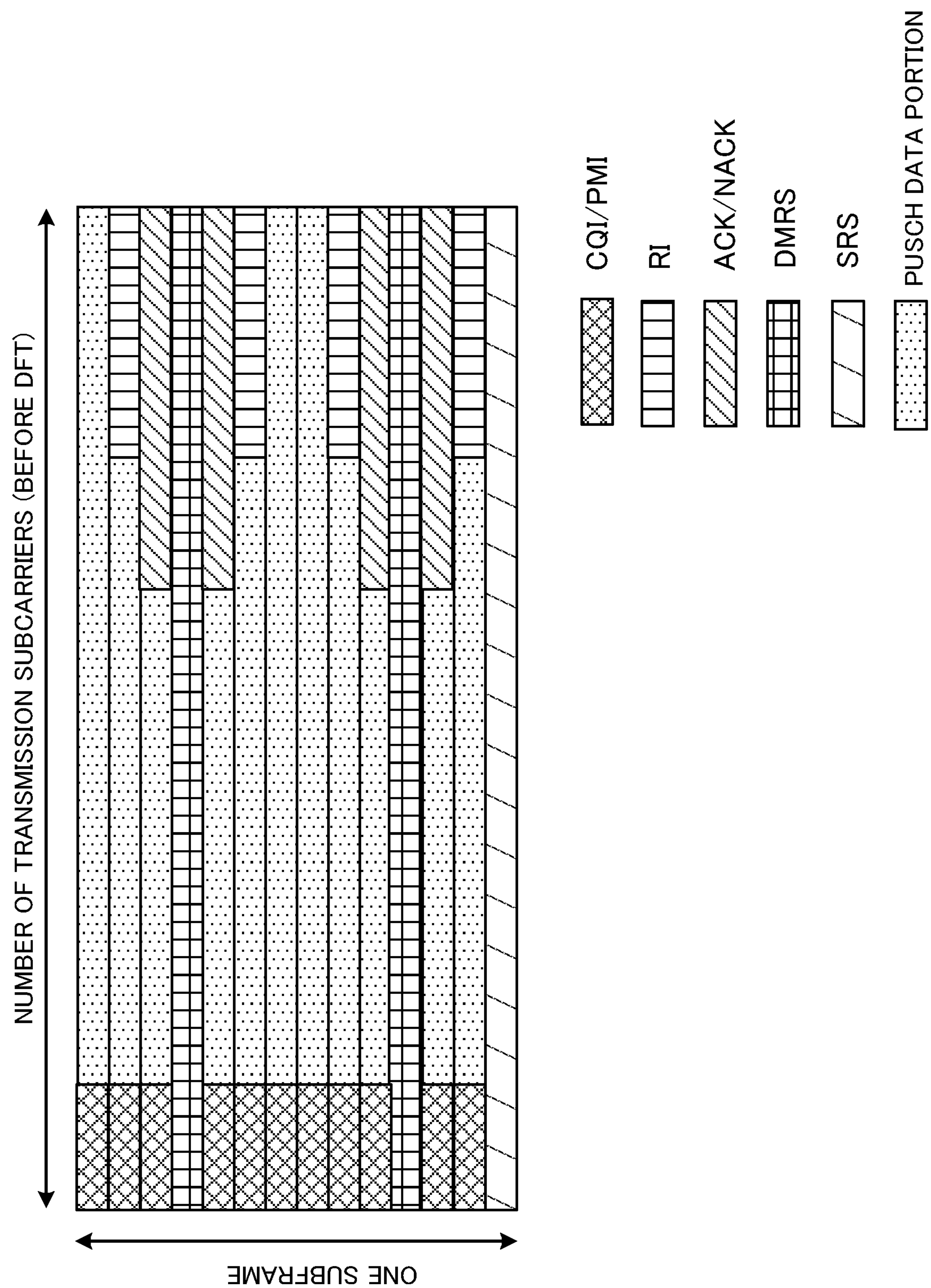
FIG. 2 is a diagram illustrating exemplary assignment of uplink control information to an uplink shared channel.

FIG. 2 illustrates an exemplary method for assigning uplink control information when uplink control information is transmitted using a PUSCH. FIG. 2 illustrates assignment before DFT (Discrete Fourier Transform) processing. As illustrated as FIG. 2, when uplink control information is assigned to an uplink shared channel, the user terminal assigns each type of uplink control information (e.g., CQI, PMI, RI, and ACK/NACK) to a predetermined region on the PUSCH and transmits them.

In this manner, the user terminal is provided with a configuration (UCI on PUSCH) which omits PUCCH transmission by multiplexing uplink control information on a PUSCH when PUSCH transmission takes place, and can thus maintain single-carrier transmission. When PUSCH transmission takes place in a plurality of CCs, a configuration which assigns uplink control information to a predetermined CC (e.g., a primary cell, or a secondary cell having a minimum cell index) can be used.

In the above-described LAA, an uplink CC (UL-CC) which uses an unlicensed band may be set (UL LAA). In this case, when the above-mentioned transmission control method (e.g., a UL transmission method) for the existing systems illustrated as FIG. 1 is employed, uplink control information may be transmitted in an unlicensed band CC.

Figure 3:
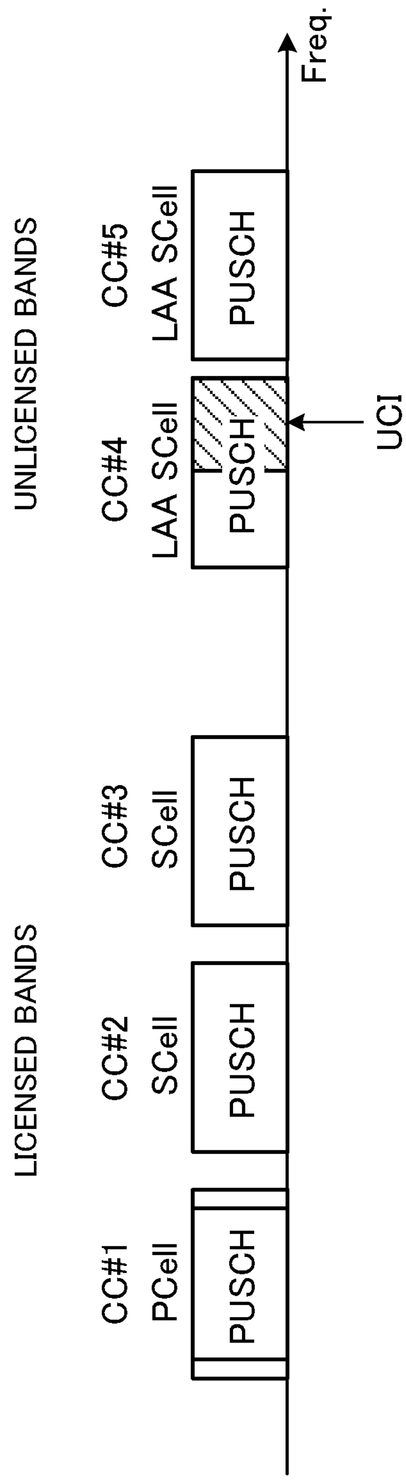
FIG. 3 is a diagram illustrating a method for assigning uplink control information using the existing systems.

When, for example, no PUSCH transmission instruction is issued for licensed band CCs and a PUSCH transmission instruction is issued for an unlicensed band CC, the user terminal transmits uplink control information using a PUSCH in the unlicensed band CC (see FIG. 3). In an LAA system, a cell (e.g., an unlicensed band cell or an unlicensed band CC) defined to apply listening will also be referred to as an LAA cell or an LAA SCell (Secondary Cell) hereinafter.

FIG. 3 illustrates that CC#1 to CC#3 are licensed band CCs and CC#4 and CC#5 are unlicensed band CCs. FIG. 3 further illustrates that in a certain transmission time interval (e.g., subframe), no PUSCH transmission instruction (timing of PUSCH transmission) is issued for licensed band CCs and a PUSCH transmission instruction is issued for an unlicensed band CC (CC#4 in this case).

In this case, when the transmission method for the existing systems is employed, the user terminal performs control to multiplex uplink control information on UL data (PUSCH) for an unlicensed band CC and transmit it. On the other hand, in an unlicensed band CC, UL data (PUSCH) transmission may be preferably controlled on the basis of the result of listening executed before the UL data transmission. In other words, the user terminal may not perform UL transmission in a subframe scheduled for an LAA SCell, depending on the LBT result (e.g., in $LBT_{busy}$).

As a solution to such a problem, the user terminal may prepare two types of uplink control information: the one that uses a PUSCH in an LAA SCell, and the other that uses a PUCCH in a primary cell (PCell). In other words, the user terminal performs control to multiplex uplink control information on a PUSCH in an LAA SCell and transmit it when the LBT result is $LBT_{idle}$, and to multiplex uplink control information on a PUCCH in a PCell and transmit it when the LBT result is $LBT_{busy}$ (see FIG. 4).

Figure 4:
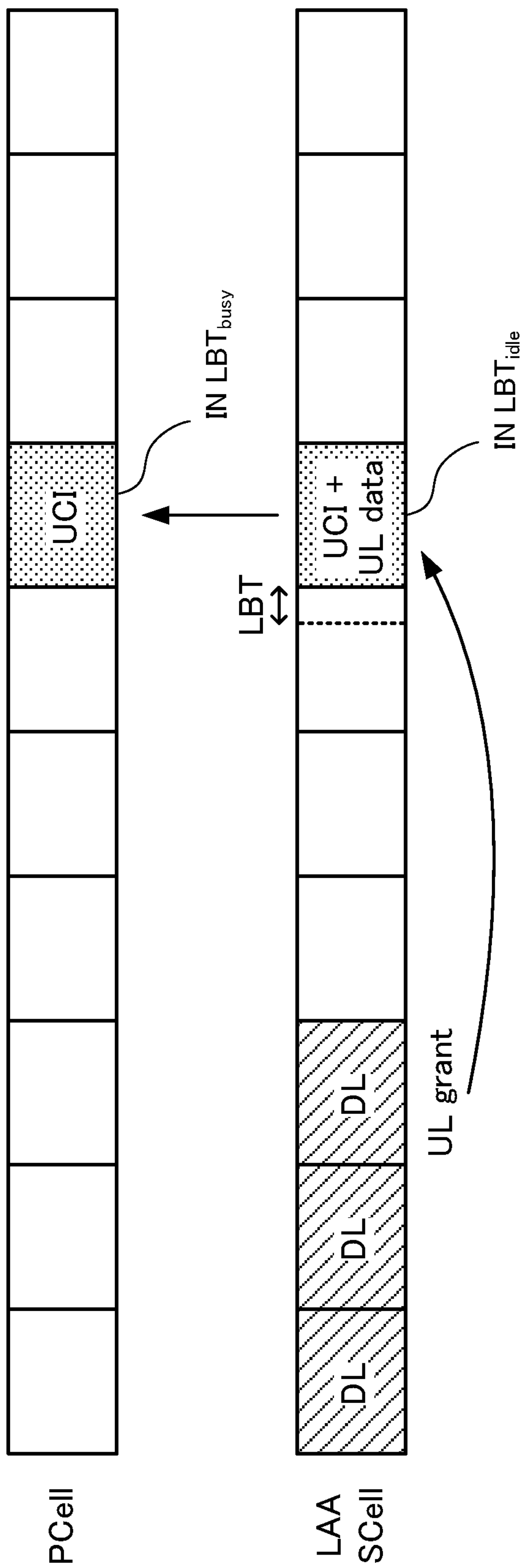
FIG. 4 is a diagram illustrating assignment control of uplink control information according to a listening result.

FIG. 4 illustrates that a user terminal having received a UL transmission instruction (UL grant) in an LAA SCell controls the method for transmitting uplink control information on the basis of the result of LBT executed before transmitting UL data at a scheduled timing.

However, when control is performed by preparing two types of uplink control information and switching the transmission method in accordance with an LBT result, the transmission operation in the user terminal may be complicated. Further, the radio base station may preferably perform an operation for receiving uplink control information, in consideration of two possibilities (uplink control information multiplexed on a PUSCH in an LAA SCell and uplink control information multiplexed on a PUCCH in a PCell). This may complicate the reception operation in the radio base station.

In view of this, as an aspect of the present invention, the inventors of the present invention hit on the idea of transmitting uplink control information without UL data (PUSCH) controlled in transmission on the basis of a listening result. For example, the user terminal performs control to transmit uplink control information (e.g., uplink control information for an LAA SCell) by a different UL channel other than a PUSCH in an LAA SCell, regardless of the result of listening executed before UL data transmission in the LAA SCell.

In this manner, even when listening is successfully executed before PUSCH transmission in an LAA SCell, transmission of uplink control information can be controlled independently of the listening result by transmitting the uplink control information without a PUSCH in the LAA SCell. As a result, the user terminal can achieve appropriate communication in a communication system which uses a cell defined to apply listening.

As another aspect of the present invention, the inventors of the present invention hit on the idea of, when UL transmission (a UL channel such as a PUSCH or a PUCCH) guaranteed in transmission in an LAA SCell takes place, transmitting uplink control information using a UL channel guaranteed in the transmission. UL transmission guaranteed in transmission in an LAA SCell means herein, e.g., UL transmission which may not involve listening, or UL transmission guaranteed in transmission regardless of the listening result.

In this manner, uplink control information can be appropriately transmitted independently of the listening result by controlling transmission of the uplink control information using a specific type of UL transmission in an LAA SCell.

The present embodiment will be described in detail below with reference to the drawings. Although the present embodiment assumes a frequency carrier for which listening (LBT) is not set as a licensed band, and a carrier for which listening is set as an unlicensed band, the present invention is not limited to this. The present embodiment is applicable to any frequency carrier (or cell) for which listening is set, regardless of whether a licensed band or an unlicensed band is defined.

Although the following description will be described in case where listening is applied in an LTE/LTE-A system, the embodiment is not limited to this. The embodiment is applicable to any system which applies listening before signal transmission and controls transmission of uplink control information.

The present embodiment may be applied to all types of uplink control information (e.g., CQI, PMI, RI, and ACK/NACK) or selectively applied to some of them (e.g., ACK/NACK and a predetermined PUCCH format).

(First Aspect)

In a first aspect, a method for transmitting UCI (Uplink Control Information) when an unlicensed band CC is used will be described.

Figure 5:
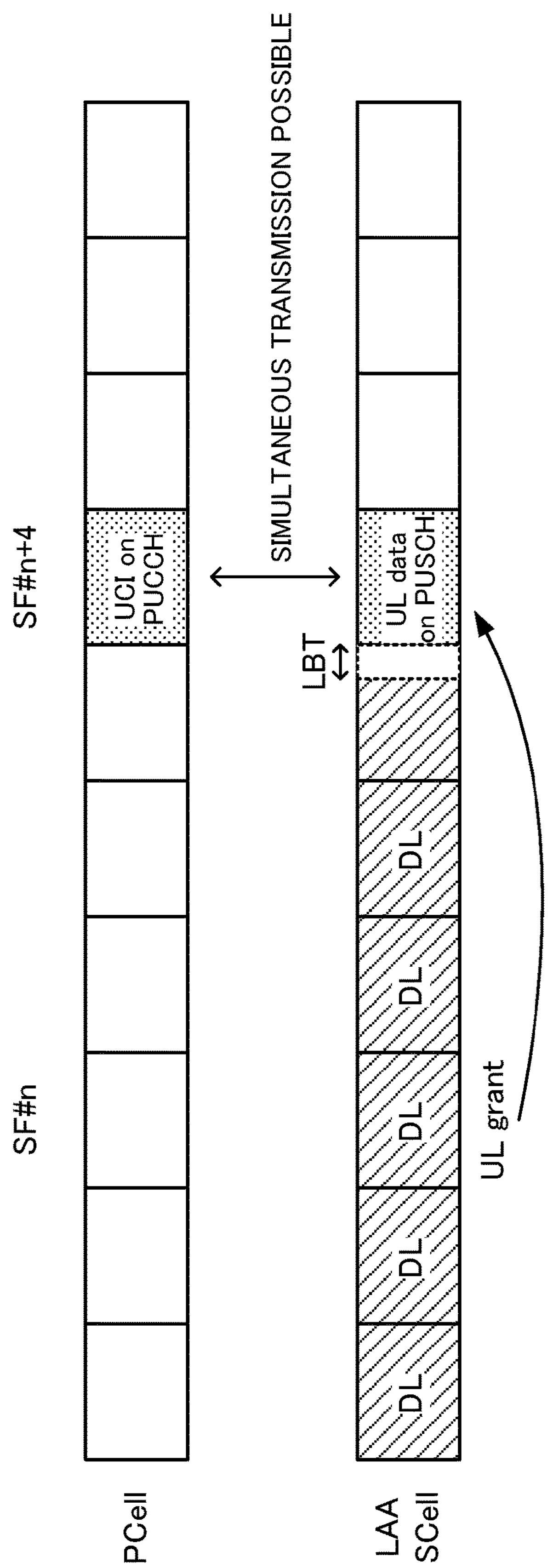
FIG. 5 is a diagram illustrating an exemplary method for transmitting uplink control information according to the present embodiment.

FIG. 5 illustrates an exemplary method for transmitting UCI when the user terminal communicates with the radio base station using a licensed band CC (e.g., a PCell) and an unlicensed band CC (e.g., an LAA SCell). FIG. 5 illustrates that a UL transmission instruction (UL grant) is notified from the radio base station to the user terminal by SF#n in the LAA SCell, and the user terminal attempts to transmit UL data (PUSCH) by SF#n+4 on the basis of the UL grant.

A UL transmission instruction in the LAA SCell may be included in DL transmission of the LAA SCell or transmitted to the user terminal, as included in DL transmission of a different cell (e.g., the PCell) (cross-carrier scheduling). The timing of UL transmission after reception of the UL transmission instruction is not limited to the configuration (after four subframes in this case) illustrated as FIG. 5, either.

Referring to FIG. 5, the user terminal executes listening before UL data transmission in the LAA SCell and controls UL transmission (e.g., UL data transmission) of SF#n+4 on the basis of the listening result. The user terminal uses not UL data (PUSCH) for the LAA SCell but a different UL channel to transmit uplink control information.

For example, the user terminal transmits uplink control information using a UL channel for a different cell (the PCell in this case) for which listening is not set. The user terminal can transmit as uplink control information, not only uplink control information for the LAA SCell but also uplink control information for a different cell (e.g., the PCell).

When uplink data (PUSCH) transmission does not take place in a different cell, the user terminal can multiplex uplink control information on a PUCCH (Physical Uplink Control Channel) and transmit it (see FIG. 5). When listening is successfully executed in the LAA SCell, the user terminal can transmit UL data (PUSCH) in the LAA SCell. In this case, the user terminal performs simultaneous transmission with a PUCCH and a PUSCH between different cells in SF#n+4.

When uplink data transmission takes place in a different cell, the user terminal can multiplex uplink control information on the PUSCH (Physical Uplink Shared Channel) of the different cell and transmit it. When PUSCH transmission takes place in a plurality of different cells (e.g., licensed band CCs), uplink control information can be multiplexed on a predetermined cell (e.g., a licensed band CC having a minimum cell index).

In this manner, the user terminal performs control to transmit uplink control information without a PUSCH in the LAA SCell, regardless of the listening result (even in $LBT_{idle}$) before uplink data transmission of the LAA SCell. In other words, the user terminal performs control so as not to multiplex uplink control information on a UL channel (e.g., a PUSCH) controlled in transmission in accordance with the listening result.

FIG. 6 illustrates an exemplary method for transmitting uplink control information when the user terminal performs communication using licensed band CCs (CC#1 to CC#3) and unlicensed band CCs (CC#4 and CC#5). The number of CCs available in the present embodiment, and the like are not limited to this.

Figures 6A, 6B:
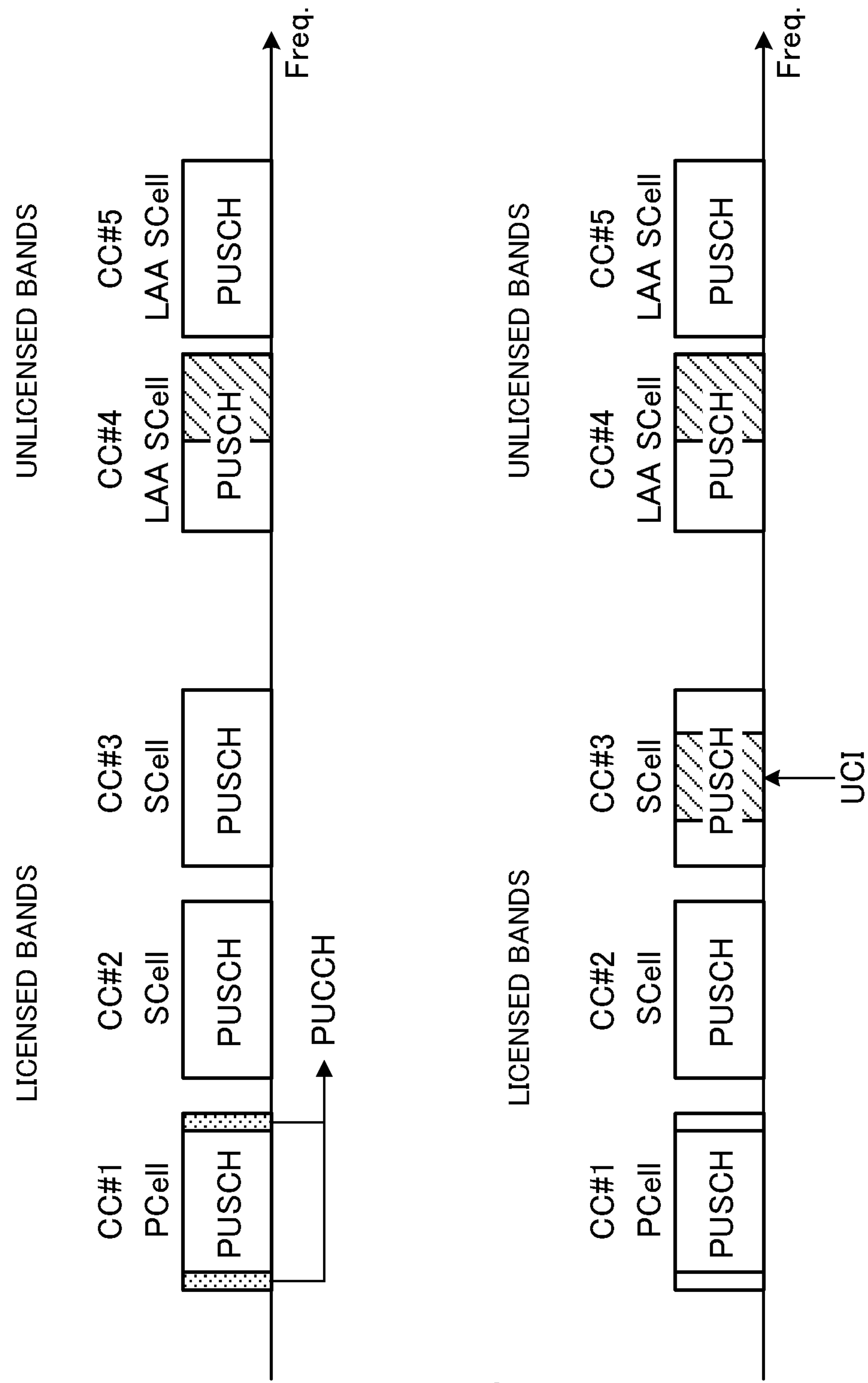
FIGS. 6A and 6B are diagrams each illustrating another exemplary method for transmitting uplink control information according to the present embodiment.

FIG. 6A illustrates that in a certain transmission time interval (e.g., subframe), no PUSCH transmission instruction is issued for licensed band CCs and a PUSCH transmission instruction is issued for an unlicensed band CC (CC#4 in this case).

In this case, even when UL data is transmitted (listening is successfully executed) in the unlicensed band CC (CC#4), the user terminal performs control to multiplex uplink control information on a PUCCH in the licensed band CC (the PCell in this case). In other words, uplink control information is transmitted without using a UL channel in CC#4 even when the timing of transmission of UL data for CC#4 coincides with that of the uplink control information for CC#4.

FIG. 6B illustrates that in a certain subframe, PUSCH transmission instructions are issued for a licensed band CC (CC#3 in this case) and an unlicensed band CC (CC#4 in this case). In this case, the user terminal performs control to multiplex uplink control information on a PUSCH in the licensed band CC (CC#3 in this case), regardless of the listening result of the unlicensed band CC (CC#4).

In this manner, control is performed to transmit uplink control information using not the UL channel (e.g., a PUSCH) in a cell for which listening is set, but a different UL channel (e.g., a PUCCH and/or a PUSCH in a licensed band CC). Thus, the user terminal may not prepare two types of uplink control information: the one that uses a PUSCH in an LAA SCell, and the other that uses a PUCCH in a licensed cell and perform transmission control according to an LBT result.

Further, the radio base station may not perform an operation for receiving uplink control information, in consideration of two possibilities (uplink control information multiplexed on the PUSCH of the LAA SCell and uplink control information multiplexed on the PUCCH of the primary cell). This allows efficient transmission and reception of uplink control information in an LAA system.

(Second Aspect)

In a second aspect, user capability information (UE capability) when uplink control information is transmitted without using uplink data (PUSCH) for an LAA SCell will be described.

As illustrated as FIGS. 5 and 6A mentioned above, when PUSCH transmission is performed when listening is successfully executed in the LAA SCell, the user terminal simultaneously performs PUCCH transmission of a licensed band CC and PUSCH transmission of an unlicensed band CC.

In this case, the user terminal that performs UL transmission (UL-LAA) using licensed band CCs and unlicensed band CCs may preferably support PUCCH-PUSCH simultaneous transmission between different cells including the LAA SCell. In the existing systems, supporting or non-supporting of PUCCH-PUSCH simultaneous transmission between licensed band CCs is set as user capability information (UE capability information), which is reported from the user terminal to the radio base station. The radio base station controls communication on the basis of the UE capability information reported from the user terminal.

In UL transmission (UL-LAA) using licensed band CCs and unlicensed band CCs, a challenge arises in how to set a UE capability. In view of this, in the present embodiment, communication between the user terminal and the radio base station can be controlled by setting the UE capability to any of the following options 1 to 3.

<Option 1>

A user terminal which performs UL-LAA is configured to involve the UE capability of PUCCH-PUSCH simultaneous transmission between different cells including the LAA SCell. In other words, in option 1, communication is controlled by defining a new UE capability for PUCCH-PUSCH simultaneous transmission between cells including the LAA SCell. In this case, a new UE capability is assumed to be supported in UL-LAA application as a premise. The UL-LAA application can thus be controlled with a clear distinction from legacy terminals by setting a new UE capability different from the existing PUCCH-PUSCH simultaneous transmission.

<Option 2>

A user terminal which performs UL-LAA is configured to involve the UE capability of PUCCH-PUSCH simultaneous transmission between different cells. In other words, in option 2, UL-LAA is permitted for a user terminal which supports the capability of PUCCH-PUSCH simultaneous transmission between different cells in the existing systems. In this case, UL-LAA may be applied without setting a new UE capability for the user terminal.

<Option 3>

A user terminal which defines a UE capability for UL-LAA and supports the UE capability of the UL-LAA may be configured to further support the capability of PUCCH-PUSCH simultaneous transmission between different cells including the LAA SCell. In other words, in option 3, a user terminal having the UE capability of UL-LAA simultaneously has the capability of PUCCH-PUSCH simultaneous transmission between cells including the LAA SCell. In this case, the number of pieces of new UE capability information set in deploying UL-LAA can be kept less.

(Third Aspect)

In a third aspect, the case where uplink control information is transmitted by selectively using a predetermined UL channel of an unlicensed band CC (e.g., an LAA SCell) will be described.

In an unlicensed band CC, when all transmission operations are assumed to always involve LBT, LBT-based transmission control may be preferably performed even for control signals, sync signals, or cell detection signals significant in communication, and the communication quality may degrade.

In an unlicensed band CC, therefore, transmission may be permitted (guaranteed) without applying LBT. For example, a configuration may be deployed which does not apply LBT to a specific signal/channel or which does not apply LBT to a signal/channel transmitted in a certain period (certain cycle) or beyond.

"Applying LBT" means executing listening (LBT) at a predetermined timing (e.g., before signal transmission) and controlling transmission on the basis of the listening result (LBT result). Further, "without applying LBT" means not executing listening (omitting listening itself) at a predetermined timing (e.g., before signal transmission), or executing listening at a predetermined timing but ignoring the listening result (performing transmission regardless of the listening result).

Figure 7:
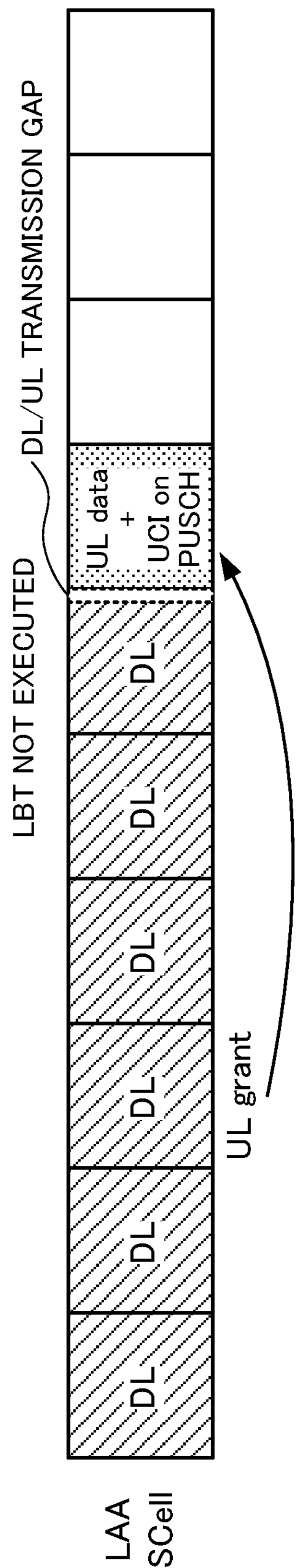
FIG. 7 is a diagram illustrating still another exemplary method for transmitting uplink control information according to the present embodiment.

In this manner, when UL transmission is guaranteed in an unlicensed band CC, a configuration can be used which transmits uplink control information using a UL channel (e.g., UL data) guaranteed in transmission (see FIG. 7). FIG. 7 illustrates that the user terminal performs UL transmission without applying LBT in an LAA SCell of SF#n+4. In this case, the user terminal performs control to multiplex uplink control information on uplink data (e.g., a PUSCH) and transmit it in the LAA SCell.

The uplink control information may be multiplexed on an uplink signal/channel other than a PUSCH. In addition, the user terminal may selectively multiplex uplink control information for the LAA SCell on the UL channel (e.g., the PUSCH) of the LAA SCell, or may multiplex not only uplink control information for the LAA SCell but also uplink control information for a different cell (e.g., a licensed band CC).

In this manner, the user terminal can transmit uplink control information by an unlicensed band CC regardless of the listening result by performing control to multiplex uplink control information on a UL channel which does not apply LBT in the unlicensed band CC.

The first and third aspects may be used in combination. For example, when UL transmission guaranteed in transmission in the LAA SCell at the timing to transmit uplink control information takes place, uplink control information is transmitted using UL transmission of the LAA SCell. When UL transmission guaranteed in transmission in the LAA SCell at the timing to transmit uplink control information does not take place, uplink control information can be transmitted using UL transmission of a different cell.

(Radio Communication System)

The configuration of a radio communication system according to an embodiment of the present invention will be described below. The radio communication method according to each of the above-mentioned aspects is applied to the radio communication system. The radio communication methods according to the above-mentioned aspects may be applied independently or in combination.

Figure 8:
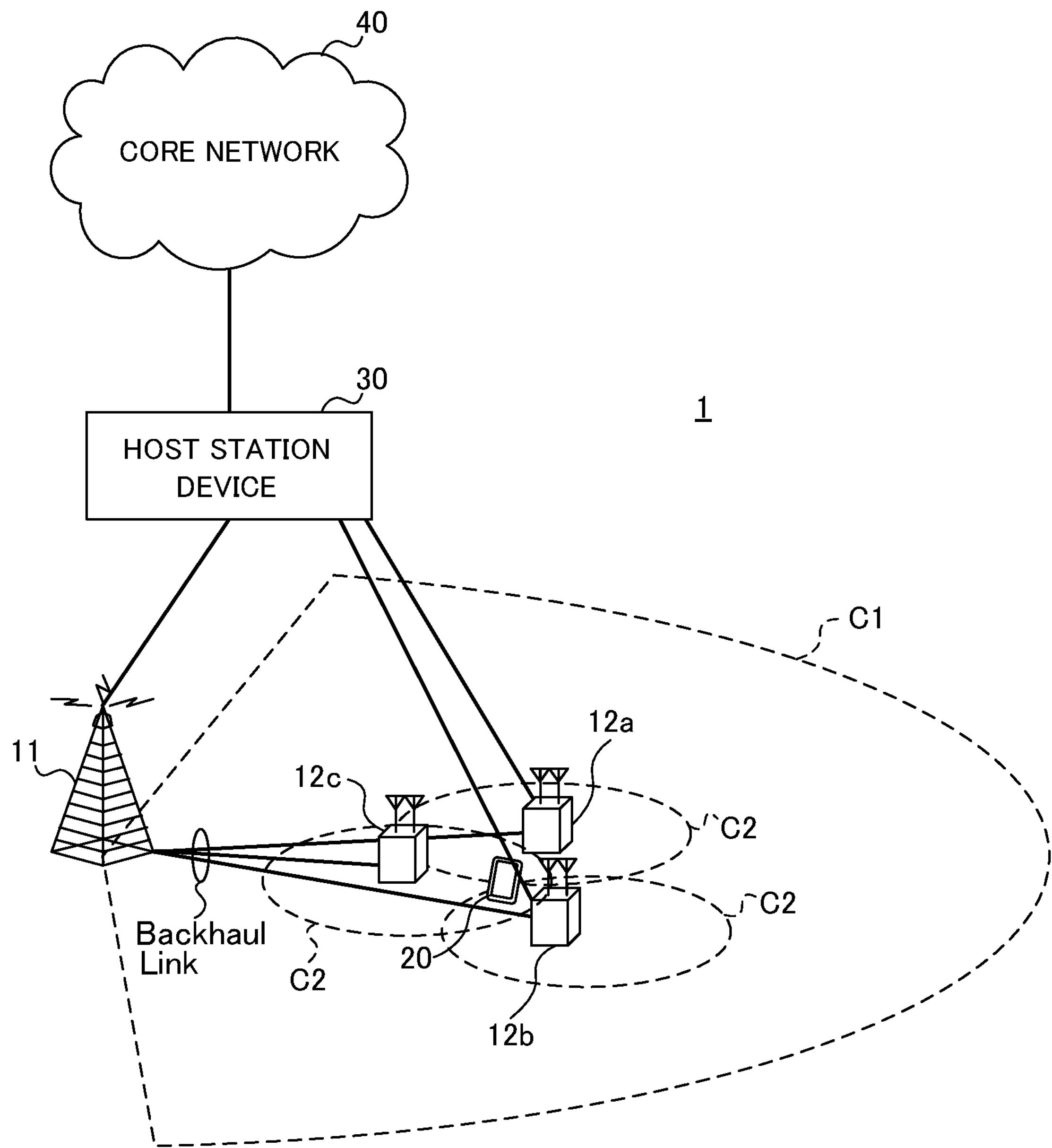
FIG. 8 is a diagram illustrating an exemplary schematic configuration of a radio communication system according to the present embodiment.

FIG. 8 is a diagram illustrating an exemplary schematic configuration of a radio communication system according to an embodiment of the present invention. In a radio communication system 1, CA (Carrier Aggregation) and/or DC (Dual Connectivity) which integrates fundamental frequency blocks (component carriers) with the system bandwidth (e.g., 20 MHz) of the LTE system as a unit is applicable. The radio communication system 1 may be called, e.g., SUPER 3G, LTE-A (LTE-Advanced), IMT-Advanced, 4G, 5G, or FRA (Future Radio Access).

The radio communication system 1 depicted as FIG. 8 includes a radio base station 11 forming a macrocell C1, and radio base stations 12*a* to 12*c* forming small cells C2 which are located in the macrocell C1 and more local than the macrocell C1. A user terminal 20 resides in the macrocell C1 and each small cell C2. A configuration which employs different numerologies between cells may be used. The numerology means a set of communication parameters characterizing the design of a signal in a certain RAT or the design of the RAT.

The user terminal 20 is connectable to both the radio base station 11 and the radio base stations 12. The user terminal 20 is expected to simultaneously use the macrocell C1 and the small cell C2 that use different frequencies by CA or DC. The user terminal 20 may employ CA or DC using a plurality of cells (CCs) (e.g., six or more CCs). The user terminal may further use licensed band CCs and unlicensed band CCs as the plurality of cells.

The user terminal 20 and the radio base station 11 can communicate with each other using a carrier (the existing carrier called, e.g., Legacy carrier) having a narrow bandwidth in a relatively low frequency band (e.g., 2 GHz). The user terminal 20 and the radio base stations 12 may communicate with each other using a carrier having a wide bandwidth in a relatively high frequency band (e.g., 3.5 or 5 GHz) or using the same carrier as in communication with the radio base station 11. The configuration of the frequency band used by each radio base station is not limited to this.

Wired connection (e.g., an X2 interface or an optical fiber conforming to the CPRI (Common Public Radio Interface)) or radio connection may be established between the radio base station 11 and the radio base stations 12 (or between the two radio base stations 12).

The radio base station 11 and each radio base station 12 are connected to a host station device 30 and further connected to a core network 40 via the host station device 30. Although the host station device 30 includes, e.g., an access gateway device, an RNC (Radio Network Controller), and an MME (Mobility Management Entity), the present invention is not limited to this. Each radio base station 12 may be connected to the host station device 30 via the radio base station 11.

The radio base station 11 has a relatively wide coverage and may be called, e.g., a macro base station, an aggregation node, an eNB (eNodeB), or a transmission and reception point. The radio base station 12 has a local coverage and may be called e.g., a small base station, a micro base station, a pico base station, a femto base station, an HeNB (Home eNodeB), an RRH (Remote Radio Head), or a transmission and reception point. The radio base stations 11 and 12 will be collectively referred to as radio base stations 10 hereinafter when no distinction is made between them.

Each user terminal 20 is a terminal that is compatible with various communication schemes such as LTE and LTE-A and may include not only mobile communication terminal but also fixed communication terminal.

The radio communication system 1 uses as a radio access scheme, OFDMA (Orthogonal Frequency Division Multiple Access) for downlinks and SC-FDMA (Single-Carrier Frequency Division Multiple Access) for uplinks. OFDMA is a multicarrier transmission scheme for communication by dividing a frequency band into narrow frequency bands (subcarriers) and mapping data to each subcarrier. SC-FDMA is a single-carrier transmission scheme for dividing the system bandwidth into bands including one or continuous resource block for each terminal, and allowing these terminals to use different bands, thus alleviating inter-terminal interference. The uplink and downlink radio access schemes are not limited to these combinations and OFDMA may be used for uplinks.

The radio communication system 1 uses, e.g., a PDSCH (Physical Downlink Shared Channel) shared by each user terminal 20, a PBCH (Physical Broadcast Channel), and a downlink L1/L2 control channel as downlink channels. The PDSCH is used to transmit, e.g., user data, upper layer control information, and an SIB (System Information Block). The PBCH is used to transmit an MIB (Master Information Block).

The downlink L1/L2 control channel includes, e.g., downlink control channels (a PDCCH (Physical Downlink Control Channel) and an EPDCCH (Enhanced Physical Downlink Control Channel)), a PCFICH (Physical Control Format Indicator Channel), and a PHICH (Physical Hybrid-ARQ Indicator Channel). The PDCCH is used to transmit, e.g. DCI (Downlink Control Information) including scheduling information of PDSCHs and PUSCHs. The PCFICH is used to transmit the number of OFDM symbols used in the PDCCH. The PHICH is used to transmit HARQ delivery acknowledgement information (ACK/NACK) for the PUSCH. The EPDCCH is frequency-division-multiplexed with the PDSCH (Physical Downlink Shared Channel) and used to transmit, e.g., DCI, like the PDCCH.

The radio communication system 1 uses, e.g., a PUSCH (Physical Uplink Shared Channel) shared by each user terminal 20, a PUCCH (Physical Uplink Control Channel), and a PRACH (Physical Random Access Channel) as uplink channels. The PUSCH is used to transmit user data and upper layer control information. The PUSCH or the PUCCH is used to transmit UCI (Uplink Control Information) including at least one of, e.g., delivery acknowledgement information (ACK/NACK) and radio quality information (CQI). The PRACH is used to transmit a random access preamble for establishing connection with a cell.

<Radio Base Station>

Figure 9:
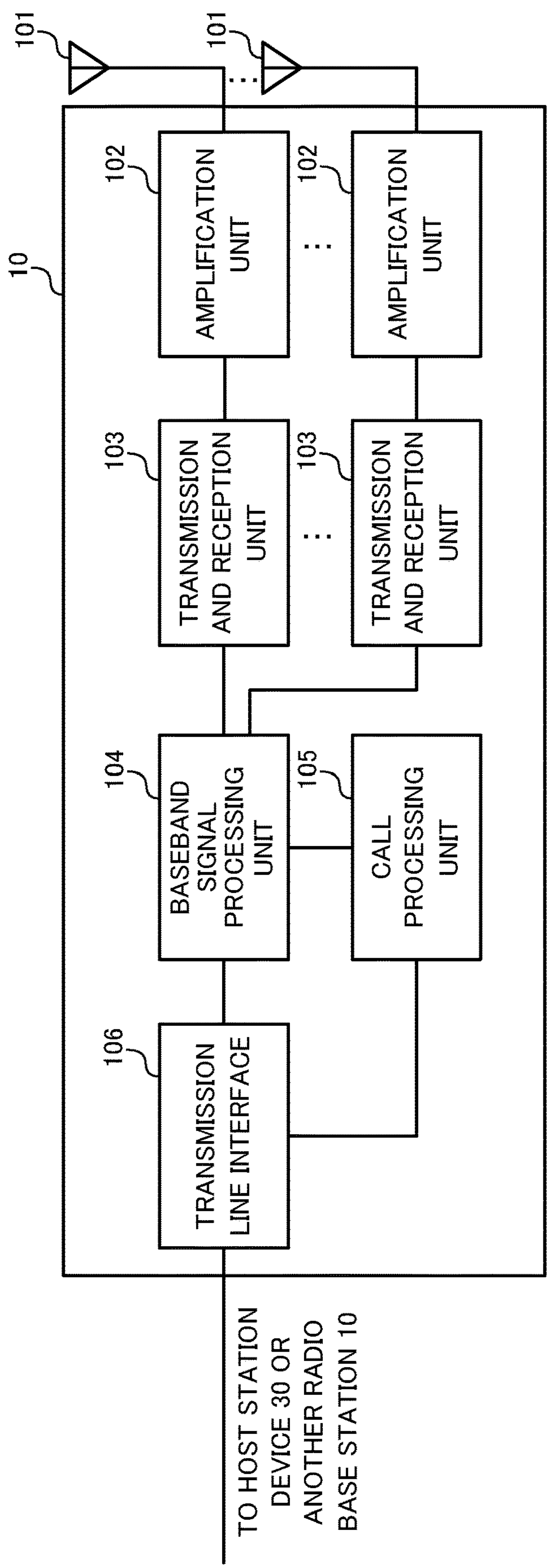
FIG. 9 is a diagram illustrating an exemplary configuration of an entire radio base station according to the present embodiment.

FIG. 9 is a diagram illustrating an exemplary configuration of an entire radio base station according to an embodiment of the present invention. The radio base station 10 includes transmission and reception antennas 101, amplification units 102, transmission and reception units 103, a baseband signal processing unit 104, a call processing unit 105, and a transmission line interface 106. The transmission and reception unit 103 includes a transmission unit and a reception unit.

User data transmitted from the radio base station 10 to the user terminal 20 by a downlink is input from the host station device 30 to the baseband signal processing unit 104 via the transmission line interface 106.

The baseband signal processing unit 104 performs transmission processing for the user data, such as PDCP (Packet Data Convergence Protocol) layer processing, user data division and coupling, RLC (Radio Link Control) layer transmission processing such as RLC retransmission control, MAC (Medium Access Control) retransmission control (e.g., HARQ (Hybrid Automatic Repeat reQuest) transmission processing), scheduling, transport format selection, channel encoding, IFFT (Inverse Fast Fourier Transform) processing, and precoding processing, and transfers the user data to the transmission and reception units 103. Transmission processing such as channel encoding and IFFT is also performed for downlink control signals, which are then transferred to the transmission and reception units 103.

The transmission and reception unit 103 converts a baseband signal precoded and output from the baseband signal processing unit 104 for each antenna into a radio frequency band and transmits it. The radio frequency signal after frequency conversion by the transmission and reception unit 103 is amplified by the amplification unit 102 and transmitted from the transmission and reception antenna 101.

The transmission and reception unit (reception unit) 103 receives uplink control information and uplink data transmitted from the user terminal. The transmission and reception unit (reception unit) 103 receives UCI (Uplink Control Information) using, e.g., an uplink channel other than uplink shared channels (e.g., an LAA SCell) controlled in transmission on the basis of a listening result (see FIGS. 5 and 6). As the uplink channel, an uplink control channel and/or an uplink shared channel in a different cell (e.g., a licensed band CC) may be used. The transmission and reception unit (transmission unit) 103 transmits a DL signal (e.g., a UL grant) to the user terminal.

The transmission and reception unit 103 may be implemented as a transmitter/receiver, a transmission and reception circuit, or a transmission and reception device described on the basis of a common understanding in the technical field according to the present invention. The transmission and reception unit 103 may serve as an integrated transmission and reception unit or include a transmission unit and reception unit.

As for uplink signals, a radio frequency signal received by the transmission and reception antenna 101 is amplified by the amplification unit 102. The transmission and reception unit 103 receives the uplink signal amplified by the amplification unit 102. The transmission and reception unit 103 performs frequency conversion of the received signal into a baseband signal and outputs it to the baseband signal processing unit 104.

The baseband signal processing unit 104 performs FFT (Fast Fourier Transform) processing, IDFT (Inverse Discrete Fourier Transform) processing, error correction decoding, MAC retransmission control reception processing, and RLC layer and PDCP layer reception processing, for user data contained in input uplink signals, and transfers the user data to the host station device 30 via the transmission line interface 106. The call processing unit 105 performs call processing such as communication channel setup and release, state management of the radio base station 10, and radio resource management.

The transmission line interface 106 exchanges signals with the host station device 30 via a predetermined interface. The transmission line interface 106 may exchange signals with a neighboring radio base station 10 (backhaul signaling) via an interface between base stations (e.g., an X2 interface or an optical fiber conforming to the CPRI (Common Public Radio Interface)).

Figure 10:
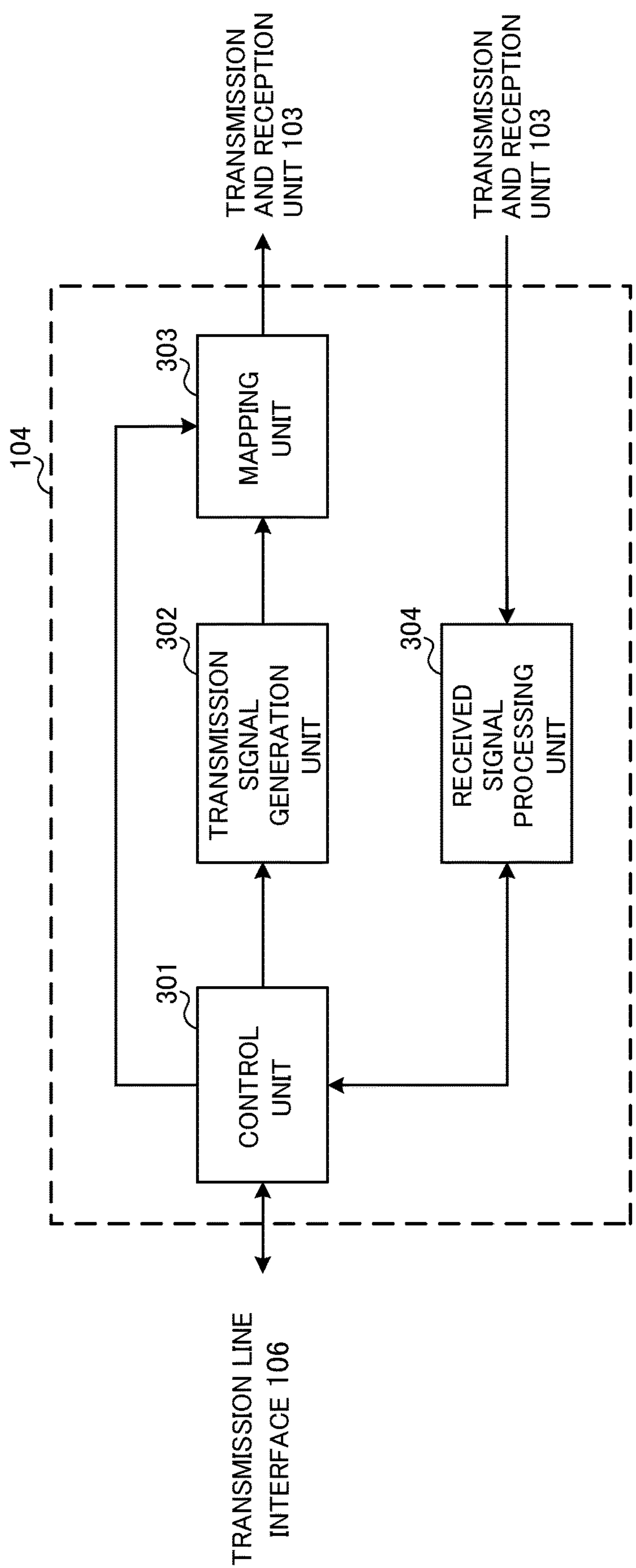
FIG. 10 is a diagram illustrating an exemplary functional configuration of the radio base station according to the present embodiment.

FIG. 10 is a diagram illustrating an exemplary functional configuration of the radio base station according to the present embodiment. FIG. 10 mainly illustrates functional blocks of feature portions in the present embodiment and the radio base station 10 also includes other functional blocks involved in radio communication. The baseband signal processing unit 104 includes a control unit (scheduler) 301, a transmission signal generation unit (generation unit) 302, a mapping unit 303, and a received signal processing unit 304, as illustrated as FIG. 10.

The control unit (scheduler) 301 controls scheduling (e.g., resource assignment) of downlink data signals transmitted by PDSCHs and downlink control signals transmitted by PDCCHs and/or EPDCCHs. The control unit 301 further controls scheduling of, e.g., system information, sync signals, paging information, CRSs (Cell-specific Reference Signals), and CSI-RSs (Channel State Information Reference Signals). The control unit 301 even controls scheduling of, e.g., uplink reference signals, uplink data signals transmitted by PUSCHs, and uplink control signals transmitted by PUCCHs and/or PUSCHs.

The control unit 301 can control transmission and reception of the transmission and reception unit (transmission unit) 103. The control unit 301 controls, e.g., reception of uplink control information and uplink data from the user terminal. The control unit 301 may be implemented as a controller, a control circuit, or a control device described on the basis of a common understanding in the technical field according to the present invention.

The transmission signal generation unit 302 generates a DL signal (including a downlink data signal and a downlink control signal) on the basis of an instruction from the control unit 301 and outputs it to the mapping unit 303. More specifically, the transmission signal generation unit 302 generates a downlink data signal (PDSCH) including user data and outputs it to the mapping unit 303. The transmission signal generation unit 302 further generates a downlink control signal (PDCCH/EPDCCH) including DCI (UL grant) and outputs it to the mapping unit 303. The transmission signal generation unit 302 further generates downlink reference signals such as a CRS and a CSI-RS and outputs them to the mapping unit 303.

The mapping unit 303 maps the DL signal generated by the transmission signal generation unit 302 to a predetermined radio resource on the basis of an instruction from the control unit 301 and outputs it to the transmission and reception unit 103. The mapping unit 303 may be implemented as a mapper, a mapping circuit, or a mapping device described on the basis of a common understanding in the technical field according to the present invention.

The received signal processing unit 304 performs reception processing (e.g., demapping, demodulation, and decoding) for a UL signal (e.g., HARQ-ACK or a PUSCH) transmitted from the user terminal 20. The processing result is output to the control unit 301. The received signal processing unit 304 may be implemented as a set of a signal processor, a signal processing circuit, or a signal processing device and a gauge, a measurement circuit, or a measurement device described on the basis of a common understanding in the technical field according to the present invention.

<User Terminal>

Figure 11:
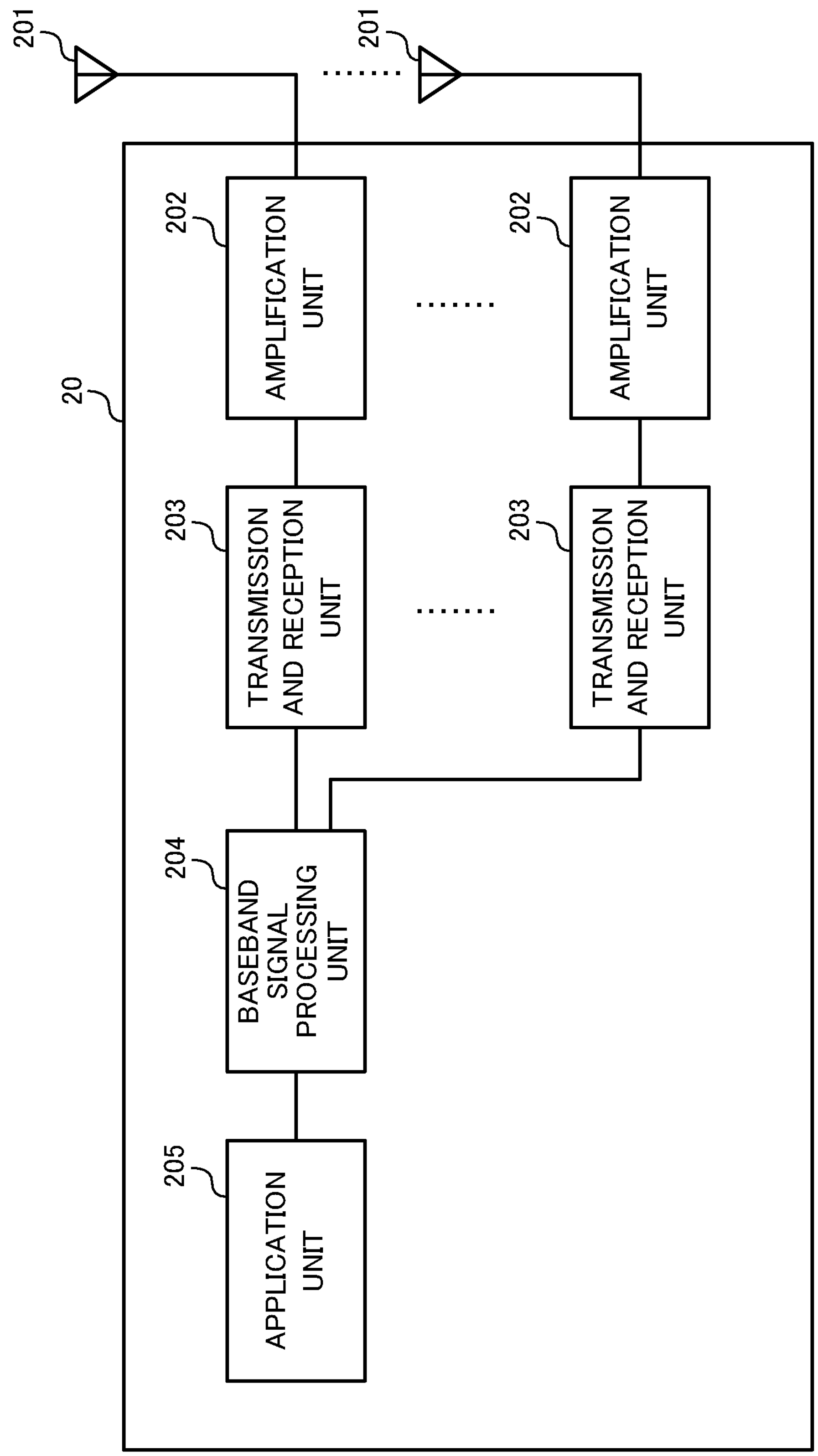
FIG. 11 is a diagram illustrating an exemplary configuration of an entire user terminal according to the present embodiment.

FIG. 11 is a diagram illustrating an exemplary configuration of an entire user terminal according to an embodiment of the present invention. The user terminal 20 includes transmission and reception antennas 201 for MIMO transmission, amplification units 202, transmission and reception units 203, a baseband signal processing unit 204, and an application unit 205. The transmission and reception unit 203 may include a transmission unit and a reception unit.

Radio frequency signals received by the transmission and reception antennas 201 are respectively amplified by the amplification units 202. The transmission and reception units 203 receive downlink signals amplified by the amplification units 202. The transmission and reception units 203 perform frequency conversion of the received signals into baseband signals and output them to the baseband signal processing unit 204.

The transmission and reception unit (reception unit) 203 receives a DL signal (e.g., downlink control information and downlink data) transmitted from the radio base station. The transmission and reception unit (reception unit) 203 transmits uplink control information and uplink data with respect to the received DL signal. The transmission and reception unit 203 may be implemented as a transmitter/receiver, a transmission and reception circuit, or a transmission and reception device described on the basis of a common understanding in the technical field according to the present invention.

The baseband signal processing unit 204 performs, e.g., FFT processing, error correction decoding, and retransmission control reception processing for an input baseband signal. User data on a downlink is transferred to the application unit 205. The application unit 205 performs, e.g., processing associated with layers above a physical layer and a MAC layer. Broadcast information of the data on a downlink is also transferred to the application unit 205.

User data on an uplink is input from the application unit 205 to the baseband signal processing unit 204. The baseband signal processing unit 204 performs, e.g., retransmission control transmission processing (e.g., HARQ transmission processing), channel encoding, precoding, DFT (Discrete Fourier Transform) processing, and IFFT processing and transfers baseband signals to each transmission and reception unit 203. The transmission and reception units 203 convert the baseband signals output from the baseband signal processing unit 204 into radio frequency bands and transmit them. The radio frequency signals after frequency conversion by the transmission and reception units 203 are amplified by the amplification units 202 and transmitted from the transmission and reception antennas 201.

Figure 12:
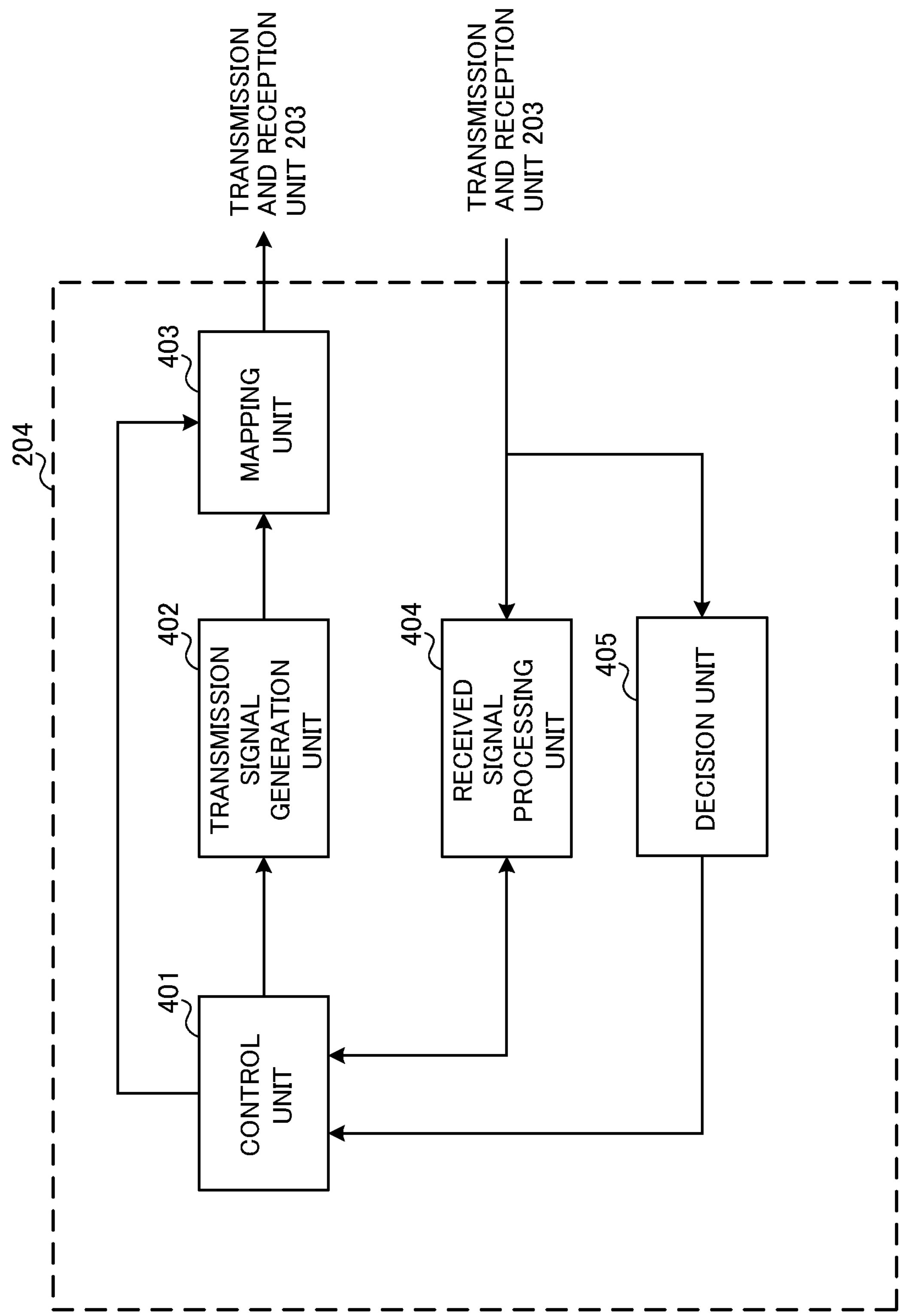
FIG. 12 is a diagram illustrating an exemplary functional configuration of the user terminal according to the present embodiment.

FIG. 12 is a diagram illustrating an exemplary functional configuration of the user terminal according to the present embodiment. FIG. 12 mainly illustrates functional blocks of feature portions in the present embodiment and the user terminal 20 also includes other functional blocks involved in wireless communication. The baseband signal processing unit 204 of the user terminal 20 includes a control unit 401, a transmission signal generation unit 402, a mapping unit 403, a received signal processing unit 404, and a decision unit 405, as illustrated as FIG. 12.

The control unit 401 obtains from the received signal processing unit 404, a downlink control signal (a signal transmitted by a PDCCH/EPDCCH) and a downlink data signal (a signal transmitted by a PDSCH) transmitted from the radio base station 10. The control unit 401 controls generation of an uplink control signal (e.g., a delivery acknowledgement signal (HARQ-ACK)) and an uplink data signal on the basis of, e.g., the result of a decision as to whether retransmission control may be preferably performed for the downlink control signal and the downlink data signal. More specifically, the control unit 401 can control the transmission signal generation unit 402, the mapping unit 403, and the received signal processing unit 404.

When communication is performed using an LAA cell which applies listening and a cell which is not defined to apply listening, the control unit 401 performs control to transmit uplink control information without using an uplink shared channel (e.g., a PUSCH in an LAA SCell) controlled in transmission on the basis of a listening result. In other words, the control unit 401 performs control to transmit uplink control information using an uplink channel (e.g., an uplink channel in a different cell) other than an uplink shared channel controlled in transmission on the basis of a listening result (see FIGS. 5 and 6).

For example, the control unit 401 performs control to transmit uplink control information using an uplink channel in a different cell other than the LAA cell when the timing of transmission of uplink control information coincides with that of an uplink shared channel controlled in transmission on the basis of a listening result. In this case, the control unit 401 can transmit uplink control information by an uplink control channel in a PCell, a PSCell, and/or a PUCCH cell (see FIGS. 5 and 6A). Again in this case, the control unit 401 performs control to execute simultaneous transmission of an uplink control channel in a different cell and an uplink shared channel in the LAA cell, in accordance with a listening result obtained in the LAA cell.

The control unit 401 further performs control to transmit uplink control information using an uplink shared channel in a different cell when the timing of transmission of uplink control information (e.g., uplink control information for LAA) coincides with that of the uplink shared channel in the different cell (see FIG. 6B).

The control unit 401 can further perform control to transmit uplink control information using an uplink channel guaranteed in transmission in the LAA cell when the timing of transmission of the uplink control information coincides with that of the uplink channel in the LAA cell (see FIG. 7). The transmission of an uplink channel guaranteed in transmission can be uplink channel transmission which does not apply LBT or uplink channel transmission in which transmission is performed regardless of the LBT result.

The control unit 401 may be implemented as a controller, a control circuit, or a control device described on the basis of a common understanding in the technical field according to the present invention.

The transmission signal generation unit 402 generates a UL signal on the basis of an instruction from the control unit 401 and outputs it to the mapping unit 403. The transmission signal generation unit 402 generates, e.g., a delivery acknowledgement signal (HARQ-ACK) and an uplink control signal such as channel state information (CSI) on the basis of instructions from the control unit 401.

The transmission signal generation unit 402 generates an uplink data signal on the basis of an instruction from the control unit 401. When, for example, a UL grant is included in the downlink control signal notified from the radio base station 10, the transmission signal generation unit 402 is instructed to generate an uplink data signal by the control unit 401. The transmission signal generation unit 402 may be implemented as a signal generator, a signal generation circuit, or a signal generation device described on the basis of a common understanding in the technical field according to the present invention.

The mapping unit 403 maps the uplink signal (an uplink control signal and/or uplink data) generated by the transmission signal generation unit 402 to a radio resource on the basis of an instruction from the control unit 401 and outputs it to the transmission and reception unit 203. The mapping unit 403 may be implemented as a mapper, a mapping circuit, or a mapping device described on the basis of a common understanding in the technical field according to the present invention.

The received signal processing unit 404 performs reception processing (e.g., demapping, demodulation, and decoding) for DL signals (e.g., a downlink control signal transmitted from the radio base station and a downlink data signal transmitted by a PDSCH). The received signal processing unit 404 outputs information received from the radio base station 10 to the control unit 401 and the decision unit 405. The received signal processing unit 404 outputs, e.g., broadcast information, system information, RRC signaling, and DCI to the control unit 401.

The received signal processing unit 404 may be implemented as a set of a signal processor, a signal processing circuit, or a signal processing device and a gauge, a measurement circuit, or a measurement device described on the basis of a common understanding in the technical field according to the present invention. The received signal processing unit 404 may implement a reception unit according to the present invention.

The decision unit 405 performs a retransmission control decision (ACK/NACK) on the basis of the decoding result obtained by the received signal processing unit 404 and outputs the decision result to the control unit 401. When downlink signals (PDSCHs) are transmitted from CCs (e.g., at least six CCs), a retransmission control decision (ACK/NACK) can be performed for each CC and the decision result can be output to the control unit 401. The decision unit 405 may be implemented as a decision circuit or a decision device described on the basis of a common understanding in the technical field according to the present invention.

(Hardware Configuration)

The block diagrams used to describe the above-described embodiment represent blocks of functional units. These functional blocks (constituent units) are implemented in any combination of hardware and/or software. The means for implementing each functional block is not particularly limited. In other words, each functional block may be implemented as one physically coupled device or implemented by at least two physically separate devices connected in a wired or wireless manner.

Figure 13:
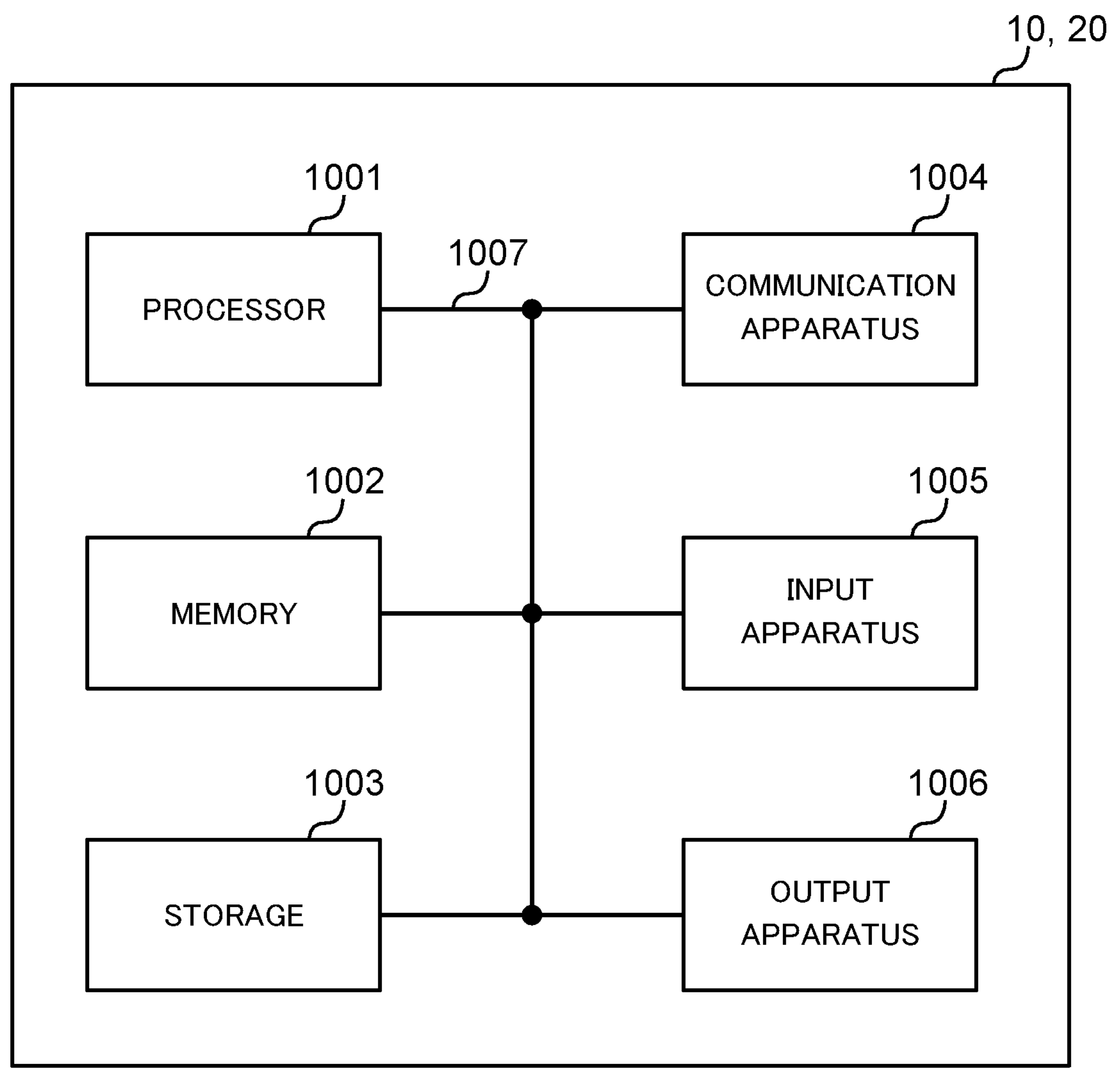
FIG. 13 is a diagram illustrating an exemplary hardware configuration of a radio base station and a user terminal according to an embodiment of the present invention.

A radio base station, a user terminal, and the like according to an embodiment of the present invention may serve as computers which perform the processes of a radio communication method according to the present invention. FIG. 13 is a diagram illustrating an exemplary hardware configuration of the radio base station and the user terminal according to an embodiment of the present invention. The above-mentioned radio base station 10 and user terminal 20 may be physically implemented as a computer apparatus including, e.g., a processor 1001, a memory 1002, a storage 1003, a communication apparatus 1004, an input apparatus 1005, an output apparatus 1006, and a bus 1007.

In the following description, the word “apparatus” may be read as a circuit, a device, a unit, or the like. The hardware configuration of the radio base station 10 and the user terminal 20 may include one or more apparatuses illustrated in the drawings or may not include some of the apparatuses.

Each function of the radio base station 10 and the user terminal 20 is implemented by reading predetermined software (program) onto hardware such as the processor 1001 or the memory 1002 to perform arithmetic operations using the processor 1001, and controlling communication using the communication apparatus 1004 and data read and/or write in the memory 1002 and the storage 1003.

The processor 1001, for example, controls the overall computer by running the operating system. The processor 1001 may be implemented as a CPU (Central Processing Unit) including, e.g., an interface with a peripheral apparatus, a control apparatus, an arithmetic apparatus, and a register. The above-mentioned baseband signal processing unit 104 (204) and the call processing unit 105, for example, may be implemented in the processor 1001.

The processor 1001 reads out a program (program code), a software module, and data from the storage 1003 and/or the communication apparatus 1004 to the memory 1002 and performs various processes in accordance with them. As the program, a program for causing the computer to execute at least some of the operations described in the above embodiment is used. The control unit 401 of the user terminal 20, for example, may be implemented as a control program stored in the memory 1002 and running on the processor 1001, and the remaining functional blocks may be implemented similarly.

The memory 1002 serves as a computer-readable recording medium and may be implemented as at least one of, e.g., a ROM (Read Only Memory), an EPROM (Erasable Programmable ROM), and a RAM (Random Access Memory). The memory 1002 may also be called, e.g., a register, a cache, or a main memory (main storage device). The memory 1002 may store, e.g., a software module and a program (program code) which can be executed to carry out a radio communication method according to an embodiment of the present invention.

The storage 1003 serves as a computer-readable recording medium and may be implemented as at least one of, e.g., an optical disk such as a CD-ROM (Compact Disc-ROM), a hard disk drive, a flexible disk, a magnetooptical disk, and a flash memory. The storage 1003 may also be referred to as an auxiliary storage apparatus.

The communication apparatus 1004 serves as hardware (transmission and reception device) for communication between computers via a wired and/or wireless (radio) network, and may also be referred to as, e.g., a network device, a network controller, a network card, or a communication module. The above-mentioned transmission and reception antenna 101 (201), the amplification unit 102 (202), the transmission and reception unit 103 (203), and the transmission line interface 106, for example, may be implemented in the communication apparatus 1004.

The input apparatus 1005 serves as an input device (e.g., a keyboard or a mouse) which receives input from the outside. The output apparatus 1006 serves as an output device (e.g., a display or a speaker) which outputs to the outside. The input apparatus 1005 and the output apparatus 1006 may form an integrated configuration (e.g., a touch panel).

The apparatuses such as the processor 1001 and the memory 1002 are connected to each other via the bus 1007 for information communication. The bus 1007 may be implemented as a single bus or different buses between the apparatuses.

The radio base station 10 and the user terminal 20 may include hardware such as a microprocessor, a DSP (Digital Signal Processor), an ASIC (Application Specific Integrated Circuit), a PLD (Programmable Logic Device), or an FPGA (Field Programmable Gate Array), and the hardware may implement some or all of respective functional blocks. For example, the processor 1001 may be implemented as at least one of these pieces of hardware.

The terms described in this specification and/or the terms involved in understanding this specification may be replaced with terms having the same or similar meanings. The channels and/or symbols, for example, may be replaced with signals (signaling). The signals may be implemented as messages. The CCs (Component Carriers) may also be referred to as, e.g., cells, frequency carriers, or carrier frequencies.

The radio frame may include one or more periods (frames) in a time domain. Each of these one or more periods (frames) forming the radio frame may also be called a subframe. The subframe may include one or more slots in the time domain. The slot may include one or more symbols (e.g., OFDM symbols or SC-FDMA symbols) in the time domain.

The radio frame, the subframe, the slot, and the symbol are units of time to transmit signals. The radio frame, the subframe, the slot, and the symbol may be referred to as other names corresponding to them. For example, one subframe may be referred to as a TTI (Transmission Time Interval), a set of consecutive subframes may be referred to as a TTI, or one slot may be referred to as a TTI. In other words, the subframe or the TTI may be a subframe (1 ms) in the existing LTE, a period (e.g., 1 to 13 symbols) shorter than 1 ms, or a period longer than 1 ms.

The TTI means, for example, the minimum time unit of scheduling in radio communication. For example, in the LTE systems, the radio base station performs scheduling in which radio resources (e.g., a frequency bandwidth and a transmission power available in each user terminal) are allocated to each user terminal, for each TTI. The definition of the TTI is not limited to this.

The RB (Resource Block) is a unit of resource allocation in a time domain and a frequency domain, and may include one or more consecutive subcarriers in the frequency domain. The RB may include one or more symbols or may be one slot, one subframe, or the length of one TTI in the time domain. One TTI or one subframe may include one or more resource blocks. The RB may also be referred to as, e.g., a PRB (Physical RB (Resource Block)), a PRB pair, or an RB pair.

The resource block may include one or more REs (Resource Elements). One RE may serve as, e.g., a radio resource region having one subcarrier or one symbol.

The structures of, e.g., the above-mentioned radio frame, subframe, slot, and symbol are merely examples. Various changes can be made to configurations such as the number of subframes included in the radio frame, the number of slots included in the subframe, the numbers of symbols and RBs included in the slot, the number of subcarriers included in the RB, and the number of symbols, the symbol length, and the CP (Cyclic Prefix) length in the TTI.

The information, parameters, and the like described in this specification may be represented by absolute values, values relative to certain values, or other types of equivalent information. The radio resources, for example, may be indicated by predetermined indices.

The information, signals, and the like described in this specification may be represented using any of diverse techniques. Data, instructions, commands, information, signals, bits, symbols, chips, and the like that may be referred to throughout the above description, for example, may be represented by voltages, currents, electromagnetic waves, magnetic fields or particles, optical fields or photons, or any combination thereof.

Software, instructions, information, and the like may be transmitted and received via transmission media. When, for example, software is transmitted from websites, servers, or other remote sources using wired technologies (e.g., a coaxial cable, an optical fiber cable, a twisted pair, and a DSL (Digital Subscriber Line)) and/or wireless technologies (e.g., infrared and microwave technologies), these wired technologies and/or wireless technologies fall within the definition of the transmission media.

The radio base station in this specification may be read as a user terminal. The respective aspects/embodiments of the present invention may be applied to, e.g., the substitution of D2D (Device-to-Device) communication between user terminals for communication between the radio base station and the user terminal. In this case, the user terminal 20 may have the above-mentioned functions of the radio base station 10. Further, the words “uplink,” “downlink,” and the like may be read as “sides.” The uplink channel, for example, may be read as a side channel.

Similarly, the user terminal in this specification may be read as a radio base station. In this case, the radio base station 10 may have the above-mentioned functions of the user terminal 20.

The respective aspects/embodiments described in this specification may be used solely, used in combination, or switchably used upon execution. The notification of predetermined information (e.g., the notification of “X”) is not limited to explicit notification, and may be done implicitly (e.g., without notification of the predetermined information).

The information notification is not limited to the aspects/embodiments described in this specification and may be done using other methods. The information notification may be done by, e.g., physical layer signaling (e.g., DCI (Downlink Control Information) or UCI (Uplink Control Information)), upper layer signaling (e.g., RRC (Radio Resource Control) signaling, broadcast information (e.g., an MIB (Master Information Block) or an SIB (System Information Block)), or MAC (Medium Access Control) signaling), other signals, or a combination thereof. The RRC signaling may also be referred to as RRC messages, which may include, e.g., RRC connection setup (RRCConnectionSetup) messages and RRC connection reconfiguration (RRCConnectionReconfiguration) messages. The MAC signaling may be notified by, e.g. a MAC CE (Control Element).

The respective aspects/embodiments described in this specification may be applied to systems which utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi®), IEEE 802.16 (Wi-MAX®), IEEE 802.20, UWB (Ultra-WideBand), Bluetooth®, and systems using other types of appropriate radio communication methods, and/or next-generation systems extended on the basis of these systems.

The processing procedures, sequences, flowcharts, and the like of the aspects/embodiments described in this specification may be executed in different orders as long as consistency can be ensured. The method described in this specification, for example, presents elements of various steps in an exemplary order, and is not limited to the presented specific order.

Although the present invention has been described in detail above, it will be apparent for those skilled in the art that the present invention is not limited to the embodiments described in this specification. For example, the above-described embodiments may be used independently or in combination. The present invention can be carried out as modifications and changed aspects without departing from the spirit and scope of the present invention defined by the description of the scope of claims. The description of this specification is for illustrative purpose and is not intended to limit the present invention in any way.

This application is based on Japanese Patent Application No. 2016-009116 filed on Jan. 20, 2016, the contents of which are incorporated herein in their entirety.

The invention claimed is:

1. A user terminal which performs communication using cells including a licensed assisted access (LAA) cell which applies listening before uplink (UL) transmission, the user terminal comprising:

a transmitter that transmits uplink control information and uplink data; and a processor that controls transmission of the uplink control information and the uplink data, wherein the processor performs control to transmit the uplink control information using an uplink channel other than an uplink shared channel of the LAA cell, wherein the user terminal is configured to define a user equipment (UE) capability information comprising a UE capability for UL-LAA defined separately from a UE capability of simultaneous transmission of the uplink control channel and the uplink shared channel between the cells including the LAA cell, and wherein when simultaneous transmission of a licensed band uplink control channel and the uplink shared channel of the LAA cell is supported the processor performs control to report the UE capability information.

2. The user terminal according to claim 1, wherein the processor performs control to transmit the uplink control information using an uplink control channel and/or an uplink shared channel in a different cell other than the LAA cell.

3. The user terminal according to claim 2, wherein the processor performs control to transmit the uplink control information by an uplink control channel in at least one of a primary cell (PCell), a primary secondary cell (PSCell), and a Physical Uplink Control Channel (PUCCH) cell.

4. The user terminal according to claim 2, wherein the uplink control information comprises hybrid automatic repeat request acknowledgement (HARQ-ACK).

5. The user terminal according to claim 1, wherein the processor performs control to transmit the uplink control information by an uplink control channel in at last one of a primary cell (PCell), a primary secondary cell (PSCell), and a Physical Uplink Control Channel (PUCCH) cell.

6. The user terminal according to claim 5, wherein the processor performs simultaneous transmission of an uplink control channel in at least one of the PCell, the PSCell and the PUCCH cell and the uplink shared channel in the LAA cell.

7. The user terminal according to claim 6, wherein the uplink control information comprises hybrid automatic repeat request acknowledgement (HARQ-ACK).

8. The user terminal according to claim 5, wherein the uplink control information comprises hybrid automatic repeat request acknowledgement (HARQ-ACK).

9. The user terminal according to claim 1, wherein the uplink control information comprises hybrid automatic repeat request acknowledgement (HARQ-ACK).

10. A radio base station that communicates with a user terminal communicating using cells including a licensed assisted access (LAA) cell which applies listening before uplink (UL) transmission, the radio base station comprising:

a receiver that receives uplink control information and uplink data transmitted from the user terminal; and a processor that controls reception of the uplink control information and the uplink data, wherein the receiver receives the uplink control information using an uplink channel other than an uplink shared channel of the LAA cell, wherein the receiver is configured to support reception of the uplink shared channel of the LAA cell and a simultaneously transmitted licensed band uplink control channel, and wherein the receiver is configured to receive user equipment (UE) capability information in which a UE capability for UL-LAA is defined separately from a UE capability of simultaneous transmission of the uplink control channel and the uplink shared channel between the cells including the LAA cell.

11. A radio communication method for a user terminal which performs communication using cells including a licensed assisted access (LAA) cell which applies listening before uplink (UL) transmission, the method comprising:

transmitting uplink control information and uplink data; and controlling transmission of the uplink control information and the uplink data, wherein the user terminal controls to transmit the uplink control information using an uplink channel other than an uplink shared channel of the LAA cell, wherein the user terminal defines user equipment (UE) capability information comprising a UE capability for UL-LAA defined separately from a UE capability of simultaneous transmission of the uplink control channel and the uplink shared channel between the cells including the LAA cell, and wherein when simultaneous transmission of a license band uplink control channel and the uplink shared channel of the LAA cell is supported, the user terminal performs control to report UE capability information.

* * * * *